July 8, 1952  R. J. BLISSIT  2,602,603
SPINNING-TYPE REEL
Filed March 24, 1951  2 SHEETS—SHEET 1
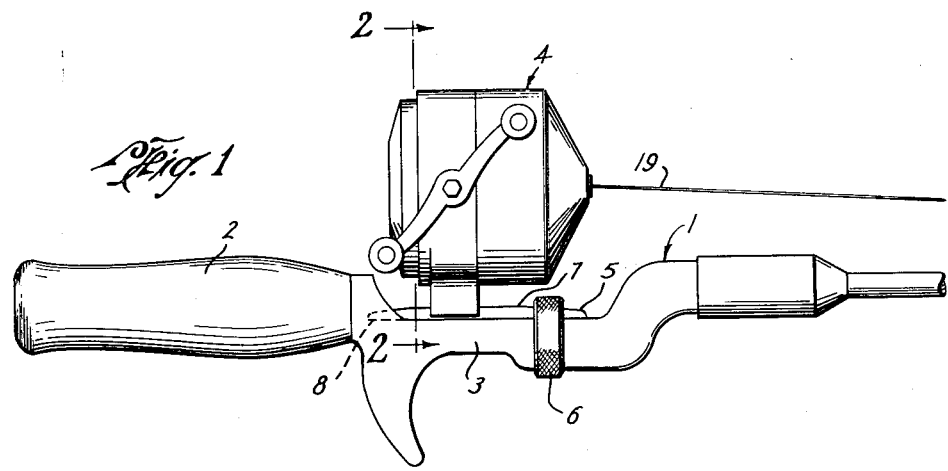
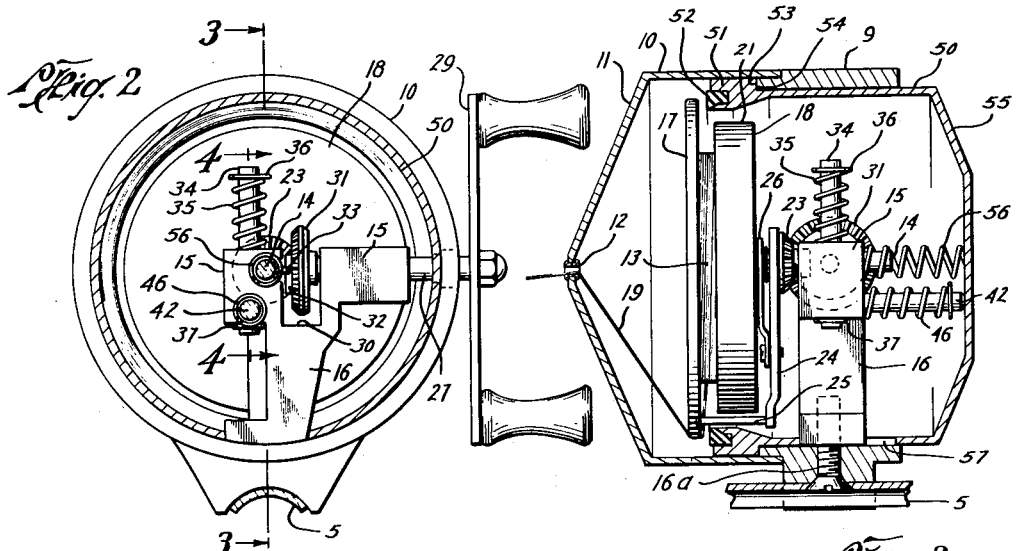
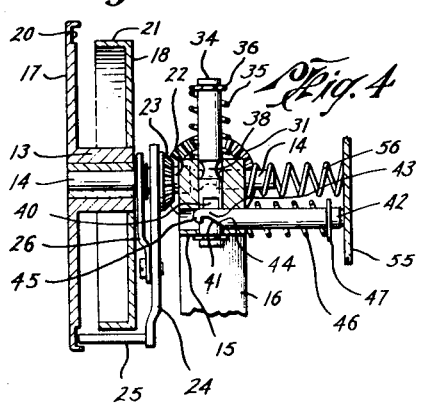
Raymond J. Blissit
INVENTOR.
BY
ATTORNEY July 8, 1952 R. J. BLISSIT 2,602,603
SPINNING-TYPE REEL
Filed March 24, 1951 2 SHEETS—SHEET 2
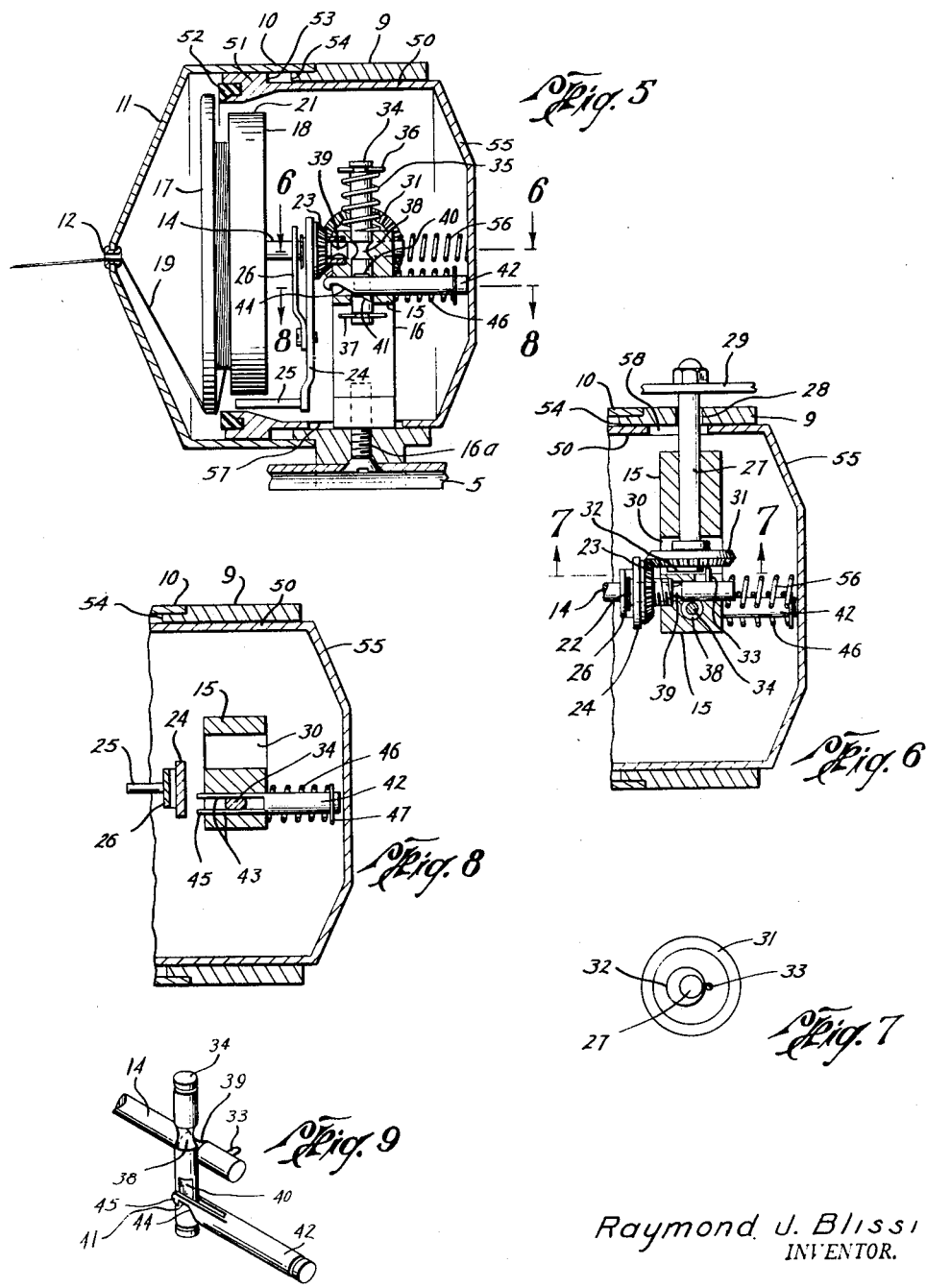
Raymond J. Blissit
INVENTOR.
BY
ATTORNEY Patented July 8, 1952

2,602,603

UNITED STATES PATENT OFFICE 2,602,603

SPINNING-TYPE REEL

Raymond J. Blissit, Broken Arrow, Okla., assignor to Zero Hour Bomb Company, Tulsa, Okla., a corporation of Oklahoma Application March 24, 1951, Serial No. 217,385

4 Claims. (Cl. 242—84.5)

This invention relates to fishing reels and more particularly to devices of the so-called "spinning reel" type.

In such devices the spool on which the line is wound remains stationary during casting and rewinding. Rewinding is ordinarily accomplished by means of a rotatable finger or pick-up member which guides the line on the spool. Prior devices have employed various arrangements for projecting and retracting the pick-up member into line-engaging and disengaging position which have proven relatively cumbersome and complicated. Moreover, such prior devices have either lacked suitable braking mechanisms for controlling the line during casting or for playing a fish or have employed mechanisms which have proven to be relatively inefficient or impractical.

The improved construction in accordance with the present invention employs a rotatable pick-up member which is located behind, and projects over, the line spool, and the line spool is movable axially relative to the pick-up member for effecting engagement and release of the line.

A further feature of the present invention is the provision of a circular braking ring which is co-axial with the line spool and axially movable to clamp the line against the forward flange of the line spool in order to effectively control the line during casting and in playing a fish, this braking ring functioning also to move the spool relative to the pick-up member to release the line for casting.

Further advantages of the construction are that no adjustments are necessary and that the reel fits any conventional fishing rod and that it handles and is operated by the ordinary movements employed in handling and operating more conventional types of fishing reels. The danger of back-lash is completely eliminated and long effortless casts, particularly of light lures, may be obtained.

Other and more specific objects and advantages of the present invention will become readily apparent from the following detailed description when read in conjunction with the accompanying drawings which illustrate one embodiment in accordance with this invention.

In the drawings:

Fig. 1 is an elevation of the reel in position on a fishing rod;

Fig. 2 is a transverse, vertical cross-sectional view on line 2—2 of Fig. 1;

Fig. 3 is a longitudinal, sectional view on line 3—3 of Fig. 2, showing the parts in positions occupied during re-winding;

Fig. 4 is a longitudinal, elevational view, partly in section, showing details of the spool and pick-up operating structure in re-winding position.

Fig. 5 is a view similar to Fig. 3, showing the parts in the positions occupied during casting and showing the brake ring in line-engaging position;

Fig. 6 is a horizontal cross-section on line 6—6 of Fig. 5;

Fig. 7 is a cross-section on line 7—7 of Fig. 6 illustrating a detail of the cam mechanism for advancing and retracting the line spool;

Fig. 8 is a cross-section on line 8—8 of Fig. 6; and

Fig. 9 is an isometric view of the several interengaging shafts and rods employed in advancing and retracting the line spool.

Referring to the drawing, the reference numeral 1 designates generally a fishing rod of any desired and generally conventional construction. This rod is provided with a handle portion 2 and is further provided with a reel-receiving portion 3, which is flattened on its upper side.

The reel, designated generally by the numeral 4, is mounted on a supporting plate 5 adapted to be secured to the reel-receiving portion of the handle. As shown a securing ring 6 is arranged on the reel-receiving portion of the rod and is adapted to slide over one end of plate 5 which is upwardly tapered at 7, to wedgingly clamp the plate to the reel-receiving portion. In the construction shown, where the reel-receiving portion of the rod merges with the handle portion, there is provided a slot 8 for the reception of the opposite end of supporting plate 5.

Reel 4 comprises a tubular casing 9 formed of any suitable material and provided with a front cover 10 which fits snugly over the forward end of casing 9 and may be removed when desired. The forward portion of cover 10 is formed with a forwardly tapering conical portion 11 provided at its apex with a line-guide opening 12. A line spool 13 is positioned forwardly of casing 9 being fixedly mounted on a shaft 14 which extends rearwardly through the casing, being axially slidable in a bearing block 15 which is attached to the bottom of casing 9, through an integral support by 16, by means of a screw 16a which, in the construction shown, is also employed to connect the casing to plate 5.

Spool 13 is provided with a circular flange 17 on its forward end and with a second circular flange 18 on its rearward end to confine between them the line 19 which is wound on the spool. Forward flange 17 is made somewhat greater in diameter than that of rearward flange 18 and an annular recess 20 is provided in the inner face of flange 17 adjacent its outer edge which extends beyond the outer periphery of flange 18. Flange 18 is provided with a peripheral lip 21 which projects forwardly over spool 13 toward flange 17.

A short sleeve 22 is rotatably mounted on shaft 14 between flange 18 and the adjacent face of bearing block 15, the inner end of sleeve 22 being rotatably journalled in this face of bearing block 15. A pinion 23 is rigidly mounted on sleeve 22 and an arm 24, suitably keyed or otherwise rigidly connected to sleeve 22, extends radially therefrom slightly beyond the periphery of flange 18. The outer end of arm 24 carries a forwardly projecting finger 25 which is adapted to extend into recess 20 when the line spool is in the retracted position, as illustrated particularly in Fig. 3. A detent 26 has one end fastened to the inner face of arm 24 and the opposite free end is transversed by shaft 14 and bears against the inner face of flange 18 whereby to normally urge spool 13 axially outwardly relative to arm 24.

A crank shaft 27 extends at right angles to shaft 14 and is rotatably journalled in bearing block 15. The outer end of shaft 27 extends through a suitable opening 28 in casing 9 (Fig. 6) and carries a winding handle 29 on its outer end. The inner end of shaft 27 extends into a slot 30 formed in bearing block 15 and carries a pinion 31 which is in mesh with pinion 23. The inner end of pinion 31 carries an eccentric cam 32 (Figs. 6 and 7) which is adapted to engage a suitable cam follower mounted on shaft 14, such as a pin 33 which extends laterally from shaft 14 whereby upon rotation of winding shaft 27, cam 32 will engage pin 33 and urge shaft 14 in the rearward direction.

A cylindrical release rod 34 extends vertically through bearing block 15 at an angle to shaft 14 and closely adjacent thereto. The upper end of rod 34 which projects from block 15 is surrounded by a coil spring 35 which is held in compression between the upper face of block 15 and a locking washer 36 which is mounted on the outer end of rod 34. With this arrangement spring 35 normally urges rod 34 in the upward direction. A lock washer 37 is mounted on the lower end of rod 34 below block 15 to limit upward movement of the rod through the block.

The portion of rod 34 within bearing block 15 is provided with a circumferential groove 38 cut on the radius of a circle which is adapted to cooperate with a similarly shaped groove cut in the surface of shaft 14 for locking and releasing shaft 14 for axial movement. This arrangement forms a clutch having the form and mode of operation of that described in detail in R. Dell Hull U. S. Patent No. 2,541,360, February 13, 1951.

The lower portion of rod 34 below groove 38 is provided on opposite sides with cam slots 40 (see particularly Fig. 9), the lower edges of which are shaped to form upwardly and forwardly tapering cams 41. A push rod 42 extends slidably through bearing block 15, generally parallel to shaft 14 and is provided at its inner end with a pair of spaced apart parallel arms 43—43 which extend on opposite sides of rod 34 and are slidable through cam slots 40. The lower edges of arms 43 are provided with downwardly and rearwardly tapering cams 44 engageable with cams 41 in cam slots 40. The outer ends of arms 43 project beyond rod 34 and are provided with downwardly extending tips 45 which are adapted to lodge against the outer ends of cams 41 to prevent retraction of push rod 42 rearwardly from the bearing block. A coil spring 46 surrounds the rearward end of push rod 42 and is held in compression between the rear face of block 15 and a lock washer 47 mounted on the outer end of push rod 42, thereby spring 46 normally urges push rod 42 in the rearward direction. Lock rod 34 and push rod 42, together with their related elements constitute a releasable locking means for spool shaft 14, which operates in a manner to be more fully described hereinafter.

A tubular sleeve 50 is mounted inside casing 10 and concentric therewith, and is dimensioned to form a close sliding fit within the casing and is movable axially therein. The nominal inner diameter of sleeve 50 is somewhat greater than the external diameter of flange 18 and is provided at its forward end with a radially thickened portion 51, in the outer face of which is disposed a brake ring 52 composed of a suitable friction-creating material, such as rubber, rubber-fabric composition, or other suitable material. Portion 51 and brake ring 52 are radially dimensioned so as to engage the inner face of flange 17 at its outer periphery when sleeve 50 is moved forwardly relative to casing 9 to the position illustrated particularly in Fig. 5. Thickened portion 51 is provided on its exterior surface with a rearwardly facing shoulder 53 which is adapted to engage an opposing shoulder 54 formed by the forward edge of casing 9 to limit the extent of rearward movement of sleeve 50 relative to casing 9. The rearward end of sleeve 50 is closed by a dome-shaped end wall 55 which is normally in contact with the rearward end of rod 42 and of a coil spring 56 which surrounds the rearward end of shaft 14, and bears against the rear face of bearing block 15. The wall of sleeve 50 is provided with longitudinally elongated slots 57 (Figs. 3 and 5) and 58 (Fig. 6) through which bearing support 16 and shaft 27, respectively extend, thereby permitting sleeve 50 to engage in the desired degree of axial movement relative to casing 9.

The above-described device operates in the following manner: Before a cast is to be made, the parts of the reel will be in the positions illustrated in Fig. 3. Sleeve 50 will be in the rearward position shown due to the rearward pressure exerted against end-wall 55 by springs 46 and 56. Spool 13 will also be in the rearwardly retracted position whereby pick-up finger 45 will be engaged in recess 20, the position attained as a result of completion of a preceding rewinding operation. Brake ring 52 will also be retracted from engagement with flange 17. To prepare the reel for making a cast, sleeve 50 will be pushed forwardly by pressure applied to end wall 55 by the thumb of the caster. This forward movement of sleeve 50 produces several substantially simultaneous actions. First, brake ring 52 will engage the edge of flange 17 and clamp line 19 between the brake ring and the edge of the flange to thereby temporarily prevent the line from feeding off of the spool. At the same time push rod 42 will be moved forwardly which will pull release rod 34 in the downward direction due to the coaction between cams 41 and 44. The downward movement of rod 34 will place groove 38 in alignment with the cylindrical portion of shaft 14 releasing shaft 14 for axial movement. These positions are pictured best in Figs. 5 and 9. With shaft 14 thus released, the forward pressure on flange 17 being exerted through sleeve 50 will force spool 13 forwardly through sleeve 22 relative to pick-up arm 24 and will place flange 17 forwardly beyond the end of pick-up finger 25 (Fig. 5). Detent 26 tends to hold the spool in this position relative to the pick-up arm. The reel is now ready for casting and as the cast is made, the thumb pressure on sleeve 50 is released, so that the sleeve and brake ring 52 will retract under the urging of springs 46 and 56, thereby releasing the line so that the weight of the lure will pull it off of spool 13. The thumb pressure may be re-applied, if desired, during the cast to cause brake ring 52 to compress the line against the edge of flange 17 to thereby limit or control the cast, this action being quite similar to "thumbing" the reel when casting with conventional reels.

When it is desired to re-wind the line, it is only necessary to start turning handle 29 in the re-winding direction. Rotation of handle 29 rotates shaft 27 causing cam 32 to engage pin 33, thereby forcing shaft 14 in the rearward direction. Since shaft 14 is rigidly connected to spool 13 the latter will be automatically retracted to the position shown in Fig. 3 wherein the end of pick-up finger 25 will enter recess 20 and engage the line. At the same time, pinion 31 which is engaged with pinion 23, will rotate the latter and sleeve 22 which will, in turn, rotate arm 24, driving finger 25 around spool 13 and thereby winding the line on the spool. The retraction of shaft 14 will allow groove 39 to come into register with rod 34, which will then automatically move upwardly through groove 39 (Fig. 4) under the urging of spring 35 to again lock shaft 14 and spool 13 in the retracted position until the re-winding operation is completed. The reel will now be ready for the next cast.

It will be understood that various modifications and changes may be made in the illustrative embodiment herein described within the scope of the appended claims but without departing from the spirit of this invention.

What I claim and desire to secure by Letters Patent is:

1. A spinning-type reel, comprising, a tubular casing, a spool shaft mounted for limited sliding movement axially in said casing, a line spool fixedly mounted on the forward end of said spool shaft, said spool having axially spaced front and rear circular flanges, the front flange being larger in diameter than the rear flange to provide an annular portion extending outwardly beyond the periphery of said rear flange, an axially stationary radial arm rotatably mounted on said spool shaft behind said spool and carrying on its outer end a line pick-up member extending forwardly over said spool toward said front flange, a crank shaft mounted in said casing, gears drivingly connecting said crank shaft with said arm, a tubular sleeve member axially reciprocable in said casing whereby its forward end may be moved into and out of engagement with said annular portion of said front flange, and resilient means mounted in said casing and normally urging said sleeve member rearwardly therein.

2. A spinning-type reel according to claim 1, wherein said forward end of said sleeve is provided with an annular friction member.

3. A spinning-type reel according to claim 1, wherein said crank shaft carries a cam engageable with a cam follower on said spool shaft whereby to move said spool shaft rearwardly in response to rotation of said crankshaft.

4. In a spinning-type reel according to claim 1, a resiliently movable lock means disposed in said casing in releasable engagement with said spool shaft to normally lock said spool shaft in rearwardly retracted position, said lock means being actuable by inward movement of said sleeve member to release said spool shaft.

RAYMOND J. BLISSIT.

No references cited.